United States Patent [19]

Dietlein

[11] Patent Number: 5,017,628

[45] Date of Patent: * May 21, 1991

[54] ASPHALT HIGHWAY JOINT SEALANT

[75] Inventor: John E. Dietlein, Bay City, Mich.

[73] Assignee: Dow Corning Corporation, Midland, Mich.

[ * ] Notice: The portion of the term of this patent subsequent to Dec. 26, 2006 has been disclaimed.

[21] Appl. No.: 336,542

[22] Filed: Apr. 11, 1989

Related U.S. Application Data

[63] Continuation of Ser. No. 7,181,790, Apr. 15, 1988, abandoned.

[51] Int. Cl.$^5$ .............................................. C08K 9/04
[52] U.S. Cl. .................................. 523/200; 524/428; 524/726; 524/731; 524/788; 528/34; 528/901
[58] Field of Search ............... 523/200; 524/731, 788, 524/726, 428; 528/901, 34

[56] References Cited

U.S. PATENT DOCUMENTS

| | | | |
|---|---|---|---|
| 3,441,583 | 4/1969 | Murphy | 260/448.2 |
| 3,766,127 | 10/1973 | Clark et al. | 260/37 |
| 3,776,933 | 12/1973 | Toporcer et al. | 260/448.2 |
| 3,817,909 | 6/1974 | Toporcer et al. | 260/37 |
| 3,996,184 | 12/1976 | Klosowski | 260/32.6 |
| 4,360,631 | 11/1982 | Hahn | 524/788 |
| 4,410,677 | 10/1983 | Lampe | 528/17 |
| 4,443,578 | 4/1984 | Frier | 524/705 |
| 4,514,529 | 4/1985 | Beers et al. | 523/200 |
| 4,889,878 | 12/1989 | Dixon et al. | 523/200 |

OTHER PUBLICATIONS

Katz, Harry S. et al., *Handbook of Fillers and Reinforcements for Plastics*, Van Nostrand Reinhold Company, New York, ©1978, p. 83.

*Primary Examiner*—John C. Bleutge
*Assistant Examiner*—R. Dean, Jr.
*Attorney, Agent, or Firm*—Edward C. Elliott

[57] ABSTRACT

A self-leveling silicone composition, which is useful as a sealant in contact with asphalt, cures upon exposure to moisture in the atmosphere to an elastomer having an elongation of at least 1200 percent, and a modulus at both 50 and 100 percent elongation of less than 25 pounds per square inch. The composition consists essentially of a hydroxyl endblocked polydiorganosiloxane, non-acidic, non-reinforcing treated filler, diacetamido functional silane, aminoxysilicon crosslinking compound, and non-reactive silicone fluid diluent.

11 Claims, No Drawings

ASPHALT HIGHWAY JOINT SEALANT

This is a continuation of copending application Ser. No. 07/181,790 filed on Apr. 15, 1988 now abandoned.

BACKGROUND OF THE INVENTION

1. Field of the Invention

This invention concerns a method and material for sealing joints in horizontal surfaces, at least one side of the joint being asphalt.

2. Background Information

Asphalt roadway surfaces, either on an asphalt pavement structure or an asphalt overlay, are subjected to cracking due to thermal stresses. The cracks can be due to the stresses in the pavement structure itself, in the asphalt overlay itself, or due to stresses in the overlay due to movement of the underlying pavement structure. In any case, these cracks must be sealed in order to prevent the intrusion of water and solid debris, which will further damage the asphalt roadway. Many concrete roadway surfaces have an asphalt shoulder along side the outer edge. The joint between the concrete and the asphalt must be sealed in order to prevent the intrusion of water and solid debris.

The traditional method of sealing has been to fill the cracks with hot applied bituminous based sealants. These work in a non-moving cracks, but not in those that move, such as the reflection cracks over an expansion joint in a pavement structure. This invention is addressed to solving the problem of sealing working cracks in asphalt roadways and shoulders.

A cold applied joint sealant usable for both portland cement and asphaltic concrete pavements is taught in U.S. Pat. No. 4,443,578 issued April 17, 1984. The formulation comprises asphalt, plasticising oil, inorganic filler, anti-settling agent, hydroxyl terminated liquid poluybutadiene resin, aromatic solvent, urethane catalyst, and polymeric isocyanate. The sealant provides an initial set in about 120 minutes, 300 percent extension at −22° F. and a penetration value of 125 to 145 at 77° F. and 35-55 at 0° F.

U.S. Pat. No. 3,766,127, issued Oct. 16, 1973, teaches a low modulus room temperature vulcanizable silicone elastomer. The composition is based upon an acetamido containing chain extender and crosslinker in combination with a hydroxyl endblocked polydiorganosiloxane. When fillers are used in the composition it is useful as a sealant.

U.S. Pat. No. 3,817,909, issued June 18, 1974, teaches a low modulus room temperature vulcanizable silicone elastomer is obtained by mixing a hydroxyl endblocked polydiorganosiloxane, non-acidic, non-reinforcing filler, acetamido containing chain extender and crosslinker which is an aminoxysilicon compound having 3 to 10 aminoxy groups per molecule. The sealant is useful in building construction.

U.S. Pat. No. 3,996,184, issued Dec. 7, 1976, teaches a one package, low modulus, room temperature vulcanizable silicone elastomer composition having improved slump characteristics at low temperatures. This composition is obtained by mixing a hydroxyl endblocked polydimethylsiloxane, non-acidic, non-reinforcing filler, methylvinyldi-(N-acetamido)silane, an aminoxysilicon compound having 3 to 10 aminoxy groups per molecule, and a diluent selected from N,N-dimethylformamide, acetonitrile, or N-n-butylacetamide. The elastomer is useful in building construction.

Materials such as discussed above have been used as highway sealants. Such materials have served very well, but they are difficult to apply because they must be extruded into the joint and then tooled to obtain a good seal to the concrete sides of the joint, since the sealants are not self-leveling. They do not perform in a joint where at least one of the sides is asphalt.

SUMMARY OF THE INVENTION

A self-leveling silicone composition, useful as a sealant in contact with asphalt, cures upon exposure to moisture in the atmosphere. The composition consists essentially of a hydroxyl endblocked polydiorganosiloxane; non-acidic, non-reinforcing, treated filler; diacetamido functional silane as chain extender; aminoxysilicone compound as crosslinking agent; and non-reactive silicone fluid diluent. The cured composition has an elongation of at least 1200 percent, and a modulus at both 50 and 100 percent elongation of less than 25 pounds per square inch.

DESCRIPTION OF THE INVENTION

This invention relates to a composition, which is stable in the absence of moisture but curable at room temperature upon exposure to moisture to a silicone elastomer, consisting essentially of a mixture prepared by mixing under anhydrous conditions (A) 100 parts by weight of a hydroxyl endblocked polydiorganosiloxane having a viscosity at 25° C. of from 5 to 100 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals,(B) from 25 to 150 parts by weight of non-acidic, non reinforcing filler having an average particle size of from 1 to 8 micrometers, said filler having been treated with a treating agent selected from the group consisting of calcium stearate,(C) from 2.5 to 10 parts by weight of a silane of the general formula

in which R' is an organic radical selected from the group consisting of methyl, ethyl, and phenyl, said silane being present in an amount sufficient to provide at least one silane molecule per hydroxyl of the polydiorganosiloxane, (D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine, R is a monovalent hydrocarbon radical, the —OX group being bonded to silicon atoms through an SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, (E) from 1 to 20 percent by weight of the total composition of a diluent consisting of nonreactive silicone fluid having a viscosity of from 1 to 100 Pa.s at 25° C., said silane (C) and said aminoxysilicone compound being present in amounts sufficient to provide a combined weight of at least 5 parts by weight per 100 parts by weight of (A), and said aminoxysilicone compound being present in an amount which is not greater than the weight of the silane (C), said composition being self leveling when applied to a surface and, when cured for fourteen days at 25° C. exposed to an air atmosphere having 50 percent relative humidity, resulting in a silicone elastomer having an elongation of at least 1200 percent and a modulus at 50 and 100 percent elongation of less than 25 pounds per square inch.

Asphalt paving material is used to form asphalt highways by building up an appreciable thickness of material, such as 8 inches, and for rehabilitating deteriorating concrete highways by overlaying with a layer such as 4 inches thick. Asphalt overlays undergo a phenomena known as reflection cracking in which cracks form in the asphalt overlay due to the movement of the underlaying concrete at the joints present in the concrete. These reflection cracks need to be sealed to prevent the intrusion of water into the crack, which will cause further destruction of the asphalt pavement when the water freezes and expands.

In order to form an effective seal for cracks that are subjected to movement for any reason, such as thermal expansion and contraction, the seal material must bond to the interface at the sidewall of the crack and must not fail cohesively when the crack compresses and expands. In the case of the asphalt pavement, the sealant must not exert enough strain on the asphalt at the interface to cause the asphalt itself to fail; that is, the modulus of the sealant must be low enough that the stress applied at the bondline is well below the yield strength of the asphalt.

An additional feature of a highway sealant which has been found to be desirable is the ability of the sealant to flow out upon application into the crack. If the sealant has sufficient flow, under the force of gravity, it will form an intimate contact with the sides of the irregular crack walls and form a good bond; without the necessity of tooling the sealant after it is extruded into the crack, in order to mechanically force it into contact with the crack sidewalls. This property will be referred to as self-leveling.

The composition of this invention was developed to yield a sealant having the unique combination of properties required to function in the sealing of asphalt pavement. The modulus of the cured material is low enough so that it does not exert sufficient force on the asphalt to cause the asphalt to fail cohesively. The cured material is such that when it is put under tension, the level of stress caused by the tension decreases with time so that the joint is not subjected to high stress levels, even if the elongation is severe.

The hydroxyl endblocked polydiorganosiloxanes (A) can have a viscosity at 25° C. of from about 5 to 100 Pa.s, preferably from 40 to 60 Pa.s. These polydiorganosiloxane can be monodispersed, polydispersed, or blends of varying viscosities as long as the average viscosity falls within the limits defined above. The hydroxyl endblocked polydiorganosiloxanes have organic groups selected from methyl, ethyl, vinyl, phenyl and 3.3.3-trifluoropropyl radicals. The organic groups of the polydiorganosiloxane contain no more than 50 percent phenyl or 3,3,3-trifluoropropyl radicals and no more than 10 percent vinyl radicals based upon the total number of radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane, and 3,3,3-trifluoropropylmethylsiloxane. The term polydiorganosiloxane as used herein does not preclude small amounts of other siloxane units such an monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The compositions of this invention contain from 25 to 125 parts by weight of non-acidic, non-reinforcing filler having an average particle size of from 1 to 8 micrometers per 100 parts by weight of hydroxyl endblocked polydiorganosiloxane. The filler is present as treated filler, having been treated with a treating agent selected from the group consisting of calcium stearate, stearic acid, salts of stearic acid, and carboxylatepolybutadiene. The fillers are non-acidic, non-reinforcing filler and include for example, calcium carbonate, ferric oxide, diatomacious earth, alumina, hydrated alumina, titanium dioxide, organic fillers, resins such as silicone resins, crushed quartz, calcium sulfate, and the like.

The filler is treated with the treating agent by either coating or reacting the filler with the treating agent. Treated fillers are commercially available, such as the calcium stearate treated calcium carbonate filler that is known as CS-11 from Georgia Marble Company of Tate, Georgia, and the Kotamite from Cyprus Industrial Minerals Company of Englewood, Colorado. The filler is required to be treated because treated filler gives a higher flow to the uncured composition and a lower modulus to the cured composition.

The silane (C) of the general formula

reacts with the hydroxyl endblocked polydiorganosiloxane to give a longer polymer. The longer polymer gives a lower modulus material that is ideal for this type of application. In the formula R' represents an organic radical of the group methyl, ethyl and phenyl. The silanes include, for example, methylvinyldi-(N-methylacetamido)silane, and methylvinyldi(N-phenylacetamido)silane. A preferred silane (C) is methylvinyldi-(N-methylacetamido)silane. These amidosilanes can be prepared by reacting a chlorosilane with an alkali metal salt of an appropriate N-organoacetamide. This method is further detailed in U.S. Pat. No. 3,776,933, issued Dec. 4, 1973 by Toporcer and Crossan, and hereby incorporated by reference for the preparation of the amidosilanes.

The amidosilanes can be prepared as by the following illustration: mixing a sodium salt of N-methylacetamide with methylvinyldichlorosilane in an inert organic solvent such as toluene, filtering the by-produced sodium chloride from the toluene-product solution, and thereafter removing the toluene by vacuum distillation to obtain the product, methylvinyldi(N-methylacetamido)silane.

The aminoxysilicone compounds (D) can be silicon compounds having from 1 to 100 silicon atoms per molecule in which there are from 3 to 10 aminoxy groups per molecule. The aminoxysilicone compounds can be prepared by the method shown in U.S. Pat. No. 3,441,583, issued Apr. 29, 1969, which also illustrates many aminoxysilicon compounds. The aminoxy silicon compounds include silanes and siloxanes. The aminoxy group which is bonded to the silicon atoms through silicon-oxygen bonds can be represented by the general formula —OX wherein X is a monovalent amine radical of the group —$NR_2$ and heterocyclic amine. R represents a monovalent hydrocarbon radical. The —$NR_2$ groups can be represented by N,N-diethylamino, N,N-ethylmethylamino, N,N--dimethylamino, N,N-diisopropylamino, N,N,-dipropylamino, N,N,-dibutylamino, N,N,-dipentylamino, N,N,-dihexylamino N,N,-dibutylamino, N,N-methylpropylamino, N,N,-diphenylamino, and N,N,-methylphenylamino. The heterocyclic amines can be illustrated by ethyleneimino, pyrrolidino, piperidino, and morpholino. Additional aminoxysilicone compounds can be found in U.S. Pat. No. 3,996,184, issued Dec. 7, 1976, which is hereby incorporated by reference to show aminoxysilicone compounds. A preferred aminoxysilicone compound is a copolymer having per molecule an average of two trimethylsiloxane units, five methyl(N,N-diethylaminoxy)siloxane units and three dimethylsiloxane units.

The amount of amidosilane (C) can be from 2.5 to 10 parts by weight per 100 parts by weight of polydiorganosiloxane polymer. The most preferred compositions have from 4 to 8 parts by weight. When the amount of amidosilane is less than 2.5 parts, the resulting composition cures to a silicone elastomer with sufficiently higher modulus so that it would no longer be classified as a low modulus silicone elastomer. The compositions can be packaged with all the reactive ingredients in one package and stored over extended periods of time under anhydrous condition, such as for three months or more. No advantages are experienced in exceeding 10 parts by weight because slower cures and less desirable physical properties are observed.

The amount of aminoxysilicone compound (D) can be from 1 to 6 parts by weight per 100 parts by weight of hydroxyl endblocked polydiorganosiloxane. The preferred amount of aminoxysilicone compound is dependent to some extent upon the viscosity of the hydroxyl endblocked polydiorganosiloxane. The larger amounts of aminoxysilicone compound are preferably used with the higher viscosity polydiorganosiloxane. If the amount of aminoxysilicone compound exceeds 6 parts, the resulting cured products are high modulus silicone elastomers. The preferred amount of aminoxysilicone compound is from 2 to 4 parts. However, the amount of aminoxysilicone compound regardless of viscosity should not exceed the weight of the amidosilane (C) and the combined weight of amidosilane (C) and aminoxysilicone compound (D) should be at least 5 parts. Amounts of aminoxysilicone compound exceeding the weight of silane (C) result in cured products having high modulus.

The composition of this invention includes from 1 to 20 percent by weight of the total composition of a diluent (E) consisting of non-reactive silicone fluid having a viscosity of from 1 to 100 Pa.s at 25° C. The non-reactive silicone fluid can be a homopolymer of $R''_2SiO$ units where $R''$ is methyl, ethyl, propyl, vinyl, or 3,3,3,-trifluoropropyl, and $R''$ can be the same or different in each unit. The end blocking unit of the silicone diluent can be $R''_3SiO$ where $R''$ is as described above. The diluent is used to give a lower modulus and a higher elongation than can be achieved without the diluent. If the viscosity of the diluent is too low, the composition does not cure properly, that is, the tack free time becomes excessive. The diluent having a higher viscosity, 12 Pa.s and above for example, appear to give a shorter tack free time than the lower viscosity material. The amount of diluent required is less for the higher viscosity material than for the lower viscosity. The preferred diluent is a trimethylsilyl endblocked polydimethylsiloxane having a viscosity of about 12.5 Pa.s at 25° C.

The compositions of this invention may contain from 1 to 8 parts by weight of a polar solvent selected from the group consisting of N,N-dimethylformamide, acetonitrile, and N-n-butylacetamide. The preferred solvent is the N,N-dimethylformamide. The preferred amount is from 1 to 3 parts by weight. It has been found that the adhesion of the sealant to the substrate is improved when these solvents are present in the formulation. They do not interfere with the self leveling property or cure of the compositions.

Other conventional additives can be used so long as they are neutral or basic, including pigments, dyes, antioxidants, heat stability additives, and the like.

The amounts used of the ingredients of the composition of this invention are chosen so that the composition, when cured for 14 days at 25° C. exposed to air having 50 percent relative humidity, results in a cured silicone elastomer having an elongation of at least 1200 percent, and a modulus at 50 and 100 percent elongation of less than 25 pounds per square inch. If the cured sealant does not meet these requirements, it does not function properly when used as a sealant in asphalt pavement; that is, the sealant will cause the asphalt to fail cohesively and thereby destroy the seal when the joint is exposed to tensile forces, such as those found when the asphalt contracts in cold weather.

The compositions are preferably made by mixing the hydroxyl endblocked polydiorganosiloxane and filler to make a homogeneous mixture with the filler well dispersed. A suitable mixture can usually be obtained in one hour using commercial mixers. The resulting mixture is preferably deaired and then a mixture of the amidosilane and aminoxysilicone compound is added and mixed with the polymer and filler mixture. This mixing is done under essentially anhydrous conditions. Then the resulting composition is put into containers for storage under essentially anhydrous conditions. Once one package compositions are made, they are stable; that is they do not cure, if the essentially moisture free conditions are maintained, but will cure to low modulus silicone elastomers when exposed to moisture at room temperature. The diluent can be mixed into the composition in any manner and at any time during the preparation, but it is preferred to add it after the polymer and filler have been mixed as a better filler dispersion takes place. Although the present compositions are designed as one package compositions, the components could be packaged in two or more packages, if desired.

The composition of this invention provides a sealant material which is self-leveling when extruded from the storage container into a horizontal joint; that is, the sealant will flow under the force of gravity sufficiently to provide intimate contact between the sealant and the sides of the joint space. This allows maximum adhesion of the sealant to the joint surface to take place. The self-leveling also does away with the necessity of tooling the sealant after it is placed into the joint, such as is required with a sealant which is designed for use in both horizontal and vertical joints. Self-leveling is defined as a material which gives a reading of not less than 2.0 in the comparative flow test as described in Example 4 below. The compositions of this invention are self-leveling primarily because of the requirement that all of the filler used be a treated filler. If untreated filler is used, the sealant is not self-leveling.

The compositions of the present invention do not require a catalyst to aid in curing the composition and it is observed that many of the conventional curing catalysts used in room temperature vulcanizable silicone elastomer compositions are detrimental to the curing of the compositions.

The following examples are included for illustrative purposes only and should not be construed as limiting the invention which is properly set forth in the appended claims. Parts are parts by weight. The numbers in parentheses are the parts based upon 100 parts of the polydimethylsiloxane fluid of A.

Example 1

A series of sealants which cured at room temperature were prepared and tested for use in contact with asphalt. None of these compositions falls within the scope of this invention. None of them gave satisfactory performance because of lack of adhesion or because of lack of proper cure.

A first composition (1) was prepared, by mixing in the absence of moisture, 43.2 parts (100) of hydroxyl endblocked polydimethylsiloxane fluid having a viscosity of about 50 Pa.s at 25° C. and a hydroxyl content of about 0.057 weight percent, 51.3 parts (119) of calcium carbonate filler having an average particle size of about 3 micrometers, 0.8 part (1.9) of dimethylformamide, 2.9 parts (6.7) of chain extender consisting of about 80 percent by weight of methylvinyldi(N-methylacetamido)-silane with the remaining 20 percent being impurities consisting primarily of methyl-N-methylacetamide, di(methylvinyl-N-acetamido)methylvinylsilane, and xylene, and 1.8 parts (4.2) of aminoxysilicone compound which was a copolymer having per molecule an average of two trimethylsiloxane units, five methyl(N,N-diethylaminoxy)siloxane units and three dimethylsiloxane units. After mixing, the composition was stored in a tube without contact with the atmosphere.

A similar composition (2) was prepared, except the crosslinker level was lowered to 2.9 parts (6.7).

A third composition (3) was prepared without crosslinker.

Further modifications to the formulation were made to try to improve the adhesion after water immersion testing as described below.

A composition (4) was prepared using the same ingredients and amounts as composition 1, but 20 parts (46.3) of trimethylsilyl endblocked polydimethylsiloxane diluent having a viscosity of 1 Pa.s at 25° C. was also added. The diluent was 16.7 percent of the total composition.

A composition (5) was prepared as in composition 1, but with the addition of 0.7 part (1.6) of hydrolyzed 2-methyl-3(2-aminoethylamino)propyl(methyl)dimethoxysilane, a material of the approximate formulation,

as an adhesion additive.

A composition (6) was prepared as in composition 1, but both 0.7 part (1.6) of the adhesion additive of composition 5 and 20 parts (46.3) of the polydimethylsiloxane of composition 4 were added. The diluent was 16.4 percent of the total composition.

The sealants were evaluated by a modification to ASTM C-719 test. Concrete-concrete and asphalt-asphalt pieces 1 inch by 1 inch by 3 inches were used to form a 2 inch long joint with a width of ½ inch and a depth of ½ inch by separating the two pieces with Teflon spacers ½ in. by ½ in. by 1 in., leaving a void space of 2 in. by 1 in by ½ in. A 2 in. long piece of ½ in diameter closed cell back-up material was placed in the bottom of this space, leaving a void of ½ in by ½ in. by 2 in. (one square inch). Sample of sealant was then extruded into this space, allowed to flow and self-level. A number of replicate samples were prepared. Curing took place over a 10 day period at laboratory conditions, followed by immersion in distilled water. After 1 day and 7 days, the samples were removed from the water and tested by flexing 60° as specified in ASTM C-719. The results are shown in Table I.

The flowability of the compositions was measured in accordance with ASTM D 2202, "Standard Test method for Slump of Caulking Compounds and Sealants".

TABLE

| Composition | Adhesion after Water Immersion | | | | Flow inch | Durometer Shore A | Tensile Strength psi | Elongation percent | Modulus 100% psi | SOT min. | TFT min. |
|---|---|---|---|---|---|---|---|---|---|---|---|
| | Concrete | | Asphalt | | | | | | | | |
| | 1 day | 10 days | 1 day | 10 days | | | | | | | |
| 1 | yes | yes | no | no | 0.05 | 19 | 127 | 1329 | 45 | 31 | 55 |
| 2 | yes | yes | no | no | 0.05 | 15 | 100+ | 1700+ | 35 | 26 | 42 |
| 3 | no | no | no | no | 0.05 | | did not cure properly, very punky | | | | |
| 4 | yes | yes | yes | yes | 0.2 | 0 | 41+ | 1700+ | 17 | 7 to 20 hr. | |
| 5 | yes | yes | no | no | 0.35 | 23 | 151 | 584 | 54 | 36 | 65 |
| 6 | yes | yes | yes | yes | 1.5 | 0 | 46 | 1022 | 18 | 7 to 20 hr. | |

+ bar did not break

The physical properties of samples of each of the above sealants were tested with the following results. The durometer was measured in accordance with ASTM D 2240. The tensile strength, elongation, and modulus were measured in accordance with ASTM D 412, with the stress applied at 20 inches per minute. In many cases the ultimate tensile strength and elongation could not be determined because the elongation exceeded the capacity of the testing machine. The SOT (skin over time) is defined as the time required for the material to cure to the point where it no loner adheres to a clean fingertip lightly applied to the surface. The cure conditions are 23° C. and 50 percent relative humidity. The TFT (tack free time) is defined as the time in minutes required for a curing material to form a non-tacky surface film. A sample is spread on a clean smooth surface and timing is begun. Periodically, a clean strip of polyethylene film is layed upon a fresh surface and a one ounce weight applied to it. After 4 seconds, the weight is removed and the strip gently pulled off. The time when the strip pulls cleanly away from the sample is recorded as the tack free time.

EXAMPLE 2

A different type of prior art sealant was evaluated for adhesion to asphalt. The sealant did not provide sufficient adhesion to asphalt. This is a comparative example.

A composition was prepared by mixing in the absence of moisture 30.2 parts (100) of the hydroxyl endblocked polydimethylsiloxane fluid of composition 1, 53.4 parts (177) of a calcium stearate treated calcium carbonate, 9 parts (30) of trimethylsilyl endblocked polydimethylsiloxane having a viscosity of 0.1 Pa.s at 25° C. (diluent was 9 percent of the total composition), 3.8 parts (12.6) of fumed silica, 1 part (3.3) of hydroxyl endblocked polymethylphenylsiloxane having a viscosity of about 0.5 Pa.s at 25° C. and about 4.5 weight percent silicon-bonded hydroxyl radicals, and 2.6 parts (8.6) of a mixture of 74 percent methyltrimethoxysilane, 24 percent chelated titanium catalyst, and 2 percent aminotrimethoxysilane.

Asphalt-asphalt test specimens were made as in Example 1, allowed to cure for 21 days and tested after 1 day immersion in water. The sealant failed in adhesion when tested in the 60° flex test.

A similar composition was prepared as above, but with the addition of 20 parts (66.2) of the trimethylsilyl endblocked polydiorganosiloxane fluid having a viscosity of 1 Pa.s used in Example 1. The diluent was 18 percent of the total composition. When tested as above, the sealant failed adhesively.

EXAMPLE 3

A series of compositions were prepared to determine if lowering the amount of filler would improve the adhesion to asphalt. These are comparative examples.

Composition (7) was prepared as for composition 1, except the filler was changed to a different calcium carbonate having a mean particle size of about 3 micrometers which had been prepared by wet grinding and drying, and the amount was reduced to 27 parts (62.5). Composition (8) was prepared as for composition 7, except the filler was reduced to 17 parts (39.3). Composition (9) was prepared as for composition 7, except the amount of filler was raised to 34 parts (78.7) and 15 parts 34.7) of ground quartz filler having an particle size below 10 micrometers was added to determine the effect of this mixture of fillers. Composition (10) was prepared as for composition 9, except 20 parts (46.3) of trimethylsilyl endblocked polydimethylsiloxane fluid having a viscosity of 12.5 Pa.s at 25° C. was added. The diluent was 17 percent of the total composition. Composition 11 was prepared as for composition 10, except the quartz filler was not added. The diluent was 19.5 percent of the total composition.

These compositions were used to prepare asphalt-asphalt test specimens as in Example 1 and tested as in Example 1 after cure for 21 days and water immersion for 7 days, with the results shown in Table II. Testing also included a durability test of 10 room temperature expansion and contraction cycles of 100 percent extension and 50 percent compression on the joint, then three extension cycles of 100 percent at a temperature of −15° F. This result is also shown in Table II.

TABLE II

| Composition | Adhesion Asphalt 7 days | Flow inch | Durability Adhesion | Durometer Shore A | Tensile Strength psi | Elongation percent | Modulus 100% psi | SOT hrs. |
|---|---|---|---|---|---|---|---|---|
| 7 | no | 1.0 | no | 6 | 83 | 1050 | 25 | |
| 8 | no | — | no | 4 | 63 | 1065 | 26 | |
| 9 | no | 0.0 | no | 16 | 115 | 900 | 40 | 0.5 |
| 10 | no | 1.8 | no* | 0 | 52 | 1200 | 16 | >8 |
| 11 | yes | 1.3 | yes | 0 | 47 | 1600 | 14 | >8 |

*adhesive failure and cohesive asphalt failure

The physical properties of samples of each of the above sealants was tested with the following results.

Composition 11 shows that it is possible to obtain adhesion to asphalt without failing to adhere to the asphalt surface, nor cause the asphalt itself to fail. However, a composition such as composition 11 is not satisfactory because it is not self-leveling and the cure time is much too long.

EXAMPLE 4

Compositions which fall within the limits of this invention were evaluated.

Composition (12) was prepared by mixing, in the absence of moisture, 43.2 parts (100) of the polydimethylsiloxane fluid of composition 1, 34.2 parts (73.2) of a calcium stearate treated calcium carbonate filler having an average particle size of about 3 micrometers, 10 parts (23.2) of trimethylsilyl endblocked polydimethylsiloxane having a viscosity of about 12.5 Pa.s at 25° (diluent was 10.8 percent of the total composition), 0.8 part (1.8) of dimethylformamide, 2.9 parts (6.7) of chain extruded consisting of about 80 percent by weight of methylvinyldi-(N-methylacetamido)silane with the remaining 20 percent being impurities consisting primarily of methyl-N-methylacatamide, di(methylvinyl-N-acetamido)methylvinylsilane, and xylene, and 1.8 parts (4.2) of aminoxy-functional crosslinker which was a copolymer having per molecule an average of two trimethylsiloxane units, five methyl(N,N-diethylaminoxy)siloxane units and three dimethylsiloxane units. After mixing, the composition was stored in a tube without contact with the atmosphere.

Composition (13) was prepared as for composition 12, but the amount of the 12.55 Pa.s trimethylsilyl endblocked polydimethylsiloxane fluid was reduced to 7.5 parts (17.4) (diluent was 8.3 percent of the total composition). Composition (14) was prepared as for composition 13, but the amount of the 12.5 Pa.s trimethylsilyl endblocked polydimethylsiloxane fluid was reduced to 5.0 parts (11.6). The diluent was 5.7 percent of the total composition.

These compositions were prepared into test specimens and tested as in Example 3, with the results shown in Table III.

The flow test is a comparative flow. A horizontal target was prepared by enscribing a series of concentric rings upon a paper sheet as follows:

| Ring No. | Diameter |
|----------|----------|
| 1 | ½ inch |
| 2 | ¾ |
| 3 | 1 |
| 4 | 1 ¼ |
| 5 | 1 ½ |

A translucent Teflon sheet was then placed over the target and one milliliter of sealant was extruded onto the Teflon sheet at the center of the target. After 10 minutes, the diameter of the sealant drop was noted by recording the number of the ring which corresponded. If the result of this test shoulded a flow corresponding to at least a 2.0, the sealant could be expected to be self-leveling; that is, the sealant applied in a joint would flow enough to level the upper surface and form an intimate interface between the sealant and the sides and bottom of the joint.

TABLE III

| Composition | Adhesion Asphalt 7 days | Comparative Flow | Durability Adhesion | Durometer Shore A | Tensile Strength psi | Elongation percent | Modulus 100% psi | SOT hrs. |
|---|---|---|---|---|---|---|---|---|
| 12 | yes | 3.5 | yes | 0 | 53+ | 2000 | 22 | 2-4 |
| 13 | yes | 3.8 | no* | 1 | 50+ | 2000+ | 22 | 2-4 |
| 14 | no | 3.5 | no* | 2 | 70+ | 2000+ | 24 | 2-4 |

*adhesive failure and cohesive asphalt failure

The physical properties of samples of each of the above sealants were tested with the following results.

Composition 12 shows that a composition meeting the requirements of this invention will function in the desired application. Compositions 13 and 14 show that the yield strength of the asphalt used in the test specimen preparation is not consistent. The cohesive asphalt failure shows that the sealant adhered to the asphalt, but that during the test, the asphalt yielded under the stress and failed cohesively.

EXAMPLE 5

A composition, falling within the limits of this invention, was prepared by mixing in the absence of moisture, 47.1 parts (100) of the hydroxyl endblocked polydimethylsiloxane of Example 1, 37.4 parts (79.4) of the calcium stearate treated calcium carbonate filler of Example 4, 10.6 parts (22.5) of the trimethylsilyl endblocked polydimethylsiloxane fluid of Example 4 (diluent was 10.6 percent of the total composition), 2.8 parts (5.9) of the chain extender and 1.6 parts (3.4) of the crosslinker of Example 4, and 0.5 part (1.1) of carbon black. Adhesion samples and physical property samples were prepared as in Example 1. The results are shown in Table IV. A peel adhesion test was run by laying a bead of sealant on a concrete substrate and upon an asphalt substrate, curing for 14 days at standard laboratory conditions of 23° and 50 percent relative humidity, and then submerging in water for 7 days. The 180° peel for the concrete substrate was 10 psi with 100 percent cohesive failure in the sealant, the peel for the asphalt substrate was 13 psi with 100 percent cohesive failure in the sealant.

TABLE IV

| SOT, minutes | 45 |
|---|---|
| Comparative Flow | 3.5 |
| Adhesion, concrete | yes |
| asphalt | yes |
| Durometer, Shore A | 0 |
| Shore OO | 40 |
| Elongation, percent | 2000+ |
| Tensile Strength, psi | 53 |
| Modulus, 50 percent, psi | 17 |
| 100 percent, psi | 18 |
| Durability Adhesion | yes |

EXAMPLE 6

A series of compositions were prepared which illustrate the invention. Each composition was prepared by mixing, in the absence of moisture, the amounts of the ingredients shown in Table V. Composition 5 is a comparative example, not containing the treated filler or diluent. It is not self-leveling. It is a suitable composition for concrete highway joint sealing. The polymer was hydroxyl endblocked polydimethylsiloxane fluid having a viscosity of about 59 Pa.s at 25° and a hydroxyl content of about 0.057 weight percent; the calcium carbonate filler had an average particle size of about 3 micrometers, the treated filler being treated with calcium stearate; the silane was a chain extender consisting of about 80 percent by weight of methylvinyldi(N-methylacetamido)silane with the remaining 20 percent being impurities consisting primarily of methyl-N-methylacetamide, di(methylvinyl-N-acetamido)methylvinylsilane, and xylene; the aminoxysilicone compound was a copolymer having per molecule an average of two trimethylsiloxane units, five methyl(N,N-diethylaminoxy)siloxane units and three dimethylsiloxane units; the diluent was trimethylsilyl endblocked polydimethylsiloxane fluid of the indicated viscosity; and the pigment was carbon black. After thorough mixing, the compositions were stored in a tube without contact with the atmosphere.

The curability of each composition was determined by measuring the skin over time (SOT), and the tack free time (TFT), as described above. The flowability of the compositions was determined as described above.

A portion of each composition was extruded onto a polyethylene coated sheet between shims and formed into a sheet about 0.075 inch thick and exposed to the atmosphere to cure. After 14 days, the cured elastomer was cut into test pieces and the durometer was measured in accordance with ASTM D 412, the tensile strength, elongation, and modulus in accordance with ASTM D 412. In this test, the stress is applied at a rate of 20 inches per minute.

Tensile adhesion joint test pieces were prepared as described above. A number of replicate samples were prepared. Tensile adhesion was evaluated by placing a tensile adhesion sample in the tensometer and applying tension at a rate of 2 inches per minute until a strain of 100 percent was reached, at which the stress reading was recorded and the machine movement stopped. After 15 minutes under the 100 percent elongation, the stress was recorded. The stress becomes much less upon holding, due to the relaxation of the composition.

Other T/A samples were placed in room temperature distilled water for 7 days, then placed in the tensometer, while wet, and pulled to destruction, recording the modulus at 50, 100, and 150 percent elongation and the tensile strength and elongation at break.

Still other T/A samples were tested in accordance with ASTM C-719, but leaving out the heat aging step since the required temperatures would melt the asphalt.

Table V lists the formulation amounts and the test results.

TABLE V

| Compositon | 1 | 2 | 3 | 4 | 5, comp. |
|---|---|---|---|---|---|
| polymer, pts. | 100 | 100 | 100 | 100 | 100 |
| calcium carbonate, treated, pts | 79.4 | 117 | 79.4 | 117 | — |
| calcium carbonate, untreated, pts | — | — | — | — | 119 |
| silane, pts | 5.9 | 5.9 | 5.9 | 5.9 | 6.7 |
| aminoxysilicone cmp'd, pts | 3.4 | 3.4 | 3.4 | 3.4 | 4.2 |
| diluent, 12,500 cs., pts | 31.8 | — | — | 22.5 | — |
| diluent, 60,000 cs., pts | — | 22.5 | 22.5 | — | — |
| pigment | 0.6 | 0.6 | 0.6 | 0.6 | — |
| FLow Number | 3.0 | 2.0 | 2.5 | 2.0 | 0.1 |
| SOT, min. | 90 | 45 | 45 | 45 | 31 |
| TFT, min. | — | — | — | — | 125 |
| Durometer, Shore A | 0 | 0 | 0 | 0 | 14 |
| Durometer, Shore OO | 40 | 45 | 46 | 48 | — |
| Modulus, at 50% elongation, psi | 16 | 19 | 15 | 16 | 37 |
| 100% elongation, psi | 17 | 19 | 16 | 18 | 43 |
| 150% elongation, psi | 18 | 21 | 17 | 19 | 47 |
| Tensile Adhesion, Stress at 100% elongation | | | | | |
| Maxiumum, psi | 3.8 | 5.5 | 5.5 | 5.6 | — |
| After 15 minutes, psi | 1.9 | 2.8 | 2.6 | 2.8 | — |
| Tensile Adhesion, after 7 days in Water | | | | | |
| Ultimate Tensile Strength, psi | 12.4 | 10.5 | 13.2 | 12.4 | — |
| Elongation at Break, percent | 1030 | 570 | 1050 | 700 | — |
| Modulus at 50% elongation, psi | 3.1 | 5.2 | 4.3 | 4.7 | — |
| 100% elongation, psi | 3.5 | 5.8 | 4.7 | 5.6 | — |
| 150% elongation, psi | 3.8 | 6.5 | 5.3 | 6.4 | — |
| Durability Adhesion | yes | yes* | yes* | yes* | no |

*small failure onone specimen

EXAMPLE 7

Examples were prepared illustrating the presence and absence of N,N-dimethylformamide in the formulation.

A composition was prepared as in Example 5. A similar composition was prepared, but with addition of 1 part of N,N-dimethylformamide. These compositions were prepared and tested as explained above, with the results shown in Table VI.

TABLE VI

| DMF | 0.0 | 0.1 |
|---|---|---|
| flow test | 3.0 | 3.0 |
| Durometer Shore OO | 37 | 38 |
| Modulus, 50%, psi | 14 | 21 |
| 100% | 15 | 22 |
| 150% | 15 | 23 |
| Durability (C-719, modified) | | |
| Asphalt | pass | pass |
| Concrete | pass | pass |
| Tensile/Adhesion, cured 21 days, then immersed in water 7 days | | |
| Asphalt | | |
| Tensile, psi | 11 | 11 |
| Elongation, % | 740 | 1015 |
| Concrete | | |
| Tensile, psi | 7 | 9 |
| Elongation, % | 780 | 1065 |

That which is claimed is:

1. A composition which is stable in the absence of moisture but curable at room temperature upon exposure to moisture to a silicone elastomer consisting essentially of a mixture prepared by mixing under anhydrous conditions (A) 100 parts by weight of a hydroxyl endblocked polydiorganosiloxane having a viscosity at 25° C. of from 5 to 100 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3trifluoropropyl radicals and no more than 10 percent of the organic groups being vinyl radicals, (B) from 25 to 150 parts by weight of non-acidic, non reinforcing filler having an average particle size of from 1 to 8 micrometers, said filler having been treated with a treating agent selected from the group consisting of calcium stearate, stearic acid, salts of stearic acid, and carboxylatepolybutadiene, (C) from 2.5 to 10 parts by weight of a silane of the general formula

in which R' is an organic radical selected from the group consisting of methyl, ethyl, and phenyl, said silane being present in an amount sufficient to provide at least one silane molecule per hydroxyl of the polydiorganosiloxane, (D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR₂ and a heterocyclic amine, R is a monovalent hydrocarbon radical, the —OX group being bonded to silicon atoms through an SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, (E) from 1 to 20 percent by weight of the total composition of a diluent consisting of non-reactive silicone fluid having a viscosity of from 1 to 100 Pa.s at 25° C., said silane (C) and said aminoxysilicone compound being present in amounts sufficient to provide a combined weight of at least 5 parts by weight per 100 parts by weight of (A), and said aminoxysilicone compound being present in an amount which is not greater than the weight of the silane (C), said composition being self leveling when applied to a surface and, when cured for fourteen days at 25° C. exposed to an air atmosphere having 50 percent relative humidity, resulting in a silicone elastomer having an elongation of at least 1200 percent and a modulus at both 50 and 100 percent elongation of less than 25 pounds per square inch.

2. The composition of claim 1 in which the hydroxyl endblocked polydiorganosiloxane is polydimethylsiloxane having a viscosity at 25° C. of from 40 to 60 Pa.s.

3. The composition of claim 2 in which the filler is a calcium stearated treated calcium carbonate.

4. The composition of claim 1 in which the silane (C) is methylvinyldi(N-methylacetamido)silane.

5. The composition of claim 1 in which the aminoxysilicone compound (D) is a copolymer having per molecule an average of two trimethylsiloxane units, five methyl (N,N-diethylaminoxy)siloxane units and three dimethylsiloxane units.

6. A composition which is stable in the absence of moisture but curable at room temperature upon exposure to moisture to a silicone elastomer consisting essentially of a mixture prepared by mixing under anhydrous conditions (A) 100 parts by weight of a hydroxyl endblocked polydiorganosiloxane having a viscosity at 25° C. of from 5 to 100 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) from 25 to 150 parts by weight of non-acidic, non reinforcing filler having an average particle size of from 1 to 8 micrometers, said filler being calcium carbonate treated with a treating agent selected from the group consisting of calcium stearate, stearic acid, and salts of stearic acid, (C) from 2.5 to 10 parts by weight of a silane of the general formula

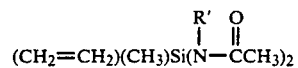

in which R' is an organic radical selected from the group consisting of methyl, ethyl, and phenyl, said silane being present in an amount sufficient to provide at least one silane molecule per hydroxyl of the polydiorganosiloxane, (D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR₂ and a heterocyclic amine, R is a monovalent hydrocarbon radical, the —OX group being bonded to silicon atoms through an SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and the halogenated monovalent hydrocarbon radicals bonded to the silicon atoms through silicon-carbon bonds, there being an average of at least one monovalent hydrocarbon radical or halogenated monovalent hydrocarbon radical per silicon atom, (E) from 1 to 20 percent by weight of the total composition of a diluent consisting of a non-reactive silicone fluid having a viscosity of from 1 to 100 Pa.s at 25° C., said silane (C) and said aminoxysilicone compound being present in amounts sufficient to provide a combined weight of at least 5 parts by weight per 100 parts by weight of (A), and said aminoxysilicone compound being present in an amount which is not greater than the weight of the silane (C), said composition being self leveling when applied to a surface and, when cured for fourteen days at 25° C. exposed to an air atmosphere having 50 percent relative humidity, resulting in a silicone elastomer having an elongation of at least 1200 percent and a modulus at both 50 and 100 percent elongation of less than 25 pounds per square inch.

7. The composition of claim 6 in which the hydroxyl endblocked polydiorganosiloxane is polydimethylsiloxane having a viscosity at 25° C. of from 40 to 60 Pa.s.

8. The composition of claim 6 in which the silane (C) is from 4 to 8 parts by weight of methylvinyldi(N-methylacetamido)silane and the aminoxysilicone compound (D) is from 2 to 4 parts by weight of aminoxyfunctional crosslinker which is a copolymer having per molecule an average of two trimethylsiloxane units, five methyl(N,N-diethylaminoxy)siloxane units and three dimethylsiloxane units.

9. The composition of claim 8 in which the diluent (E) is a trimethylsilyl endblocked polydimethylsiloxane having a viscosity of above 12 Pa.s at 25° C.

10. The composition of claim 9 in which there is also present N,N-dimethylformamide in an amount of from 1 to 8 parts by weight.

11. The composition of claim 1 in which the diluent (E) has a viscosity of from 12 to 100 Pa.s at 25° C.

* * * * *